United States Patent [19]

Sundhararajan et al.

[11] Patent Number: 5,714,715
[45] Date of Patent: Feb. 3, 1998

[54] CABLE END SEAL FOR OIL-FILLED CABLES

[75] Inventors: Srinivasan Sundhararajan; Rafael Garcia-Ramirez, both of Austin; Gordon Lawrence Ackland; Ted Flynn Hutchinson, both of Leander, all of Tex.

[73] Assignee: Minnesota Mining and Manufacturing Company, St. Paul, Minn.

[21] Appl. No.: 564,137

[22] PCT Filed: Jan. 22, 1996

[86] PCT No.: PCT/US96/01004

§ 371 Date: Jan. 22, 1996

§ 102(e) Date: Jan. 22, 1996

[87] PCT Pub. No.: WO97/27656

PCT Pub. Date: Jul. 31, 1997

[51] Int. Cl.$^6$ .................... H02G 15/23; H02G 15/25
[52] U.S. Cl. .................... 174/20; 174/23 R; 174/75 B
[58] Field of Search .................... 174/20, 21 R, 174/23 R, 74 R, 75 B, 76, 82; 523/173

[56] References Cited

U.S. PATENT DOCUMENTS

| | | | |
|---|---|---|---|
| 2,195,933 | 4/1940 | Marlborough et al. | 174/21 R |
| 2,962,542 | 11/1960 | Witt | 174/76 |
| 4,865,890 | 9/1989 | Erlichman | 428/35.1 X |
| 5,183,966 | 2/1993 | Hurtado et al. | 474/20 X |
| 5,374,784 | 12/1994 | Wentzel | 174/73.1 |
| 5,408,047 | 4/1995 | Wentzel | 174/73.1 |

FOREIGN PATENT DOCUMENTS

| | | | |
|---|---|---|---|
| 626792 | of 1936 | Germany | 174/20 |
| 912955 | of 1954 | Germany | 174/20 |
| 347410 | 4/1931 | United Kingdom | 174/20 |
| 2 181 904 | 9/1986 | United Kingdom | H02G 15/00 |
| 2 218 280 | 11/1989 | United Kingdom | H02G 15/22 |
| 2 243 254 | 10/1991 | United Kingdom | H02G 15/08 |
| WO 92/08265 | 5/1992 | WIPO | |

OTHER PUBLICATIONS

3M Brochure: Cellpack Working Instructions; 3M Electrical Products Division, CH-5610 Wohlen/Switzerland: Tenaga Nasional Berhad, West Malaysia; M8E065—Apr. 1992.

*Primary Examiner*—Hyung S. Sough
*Assistant Examiner*—Chau N. Nguyen
*Attorney, Agent, or Firm*—Gary L. Griswold; Walter N. Kirn; Matthew B. McNutt

[57] ABSTRACT

A cable end seal for a multiple-conductor oil filled cable includes an inner sealing boot adjacent the cable and filled with an oil restraint material for the temporary restraint of cable oil and an outer boot and cylindrical mold filled with hardenable material for the permanent containment of the cable oil. The inner boot and oil restraint material prevents contact between the oil and the material at least until the material has hardened.

12 Claims, 1 Drawing Sheet

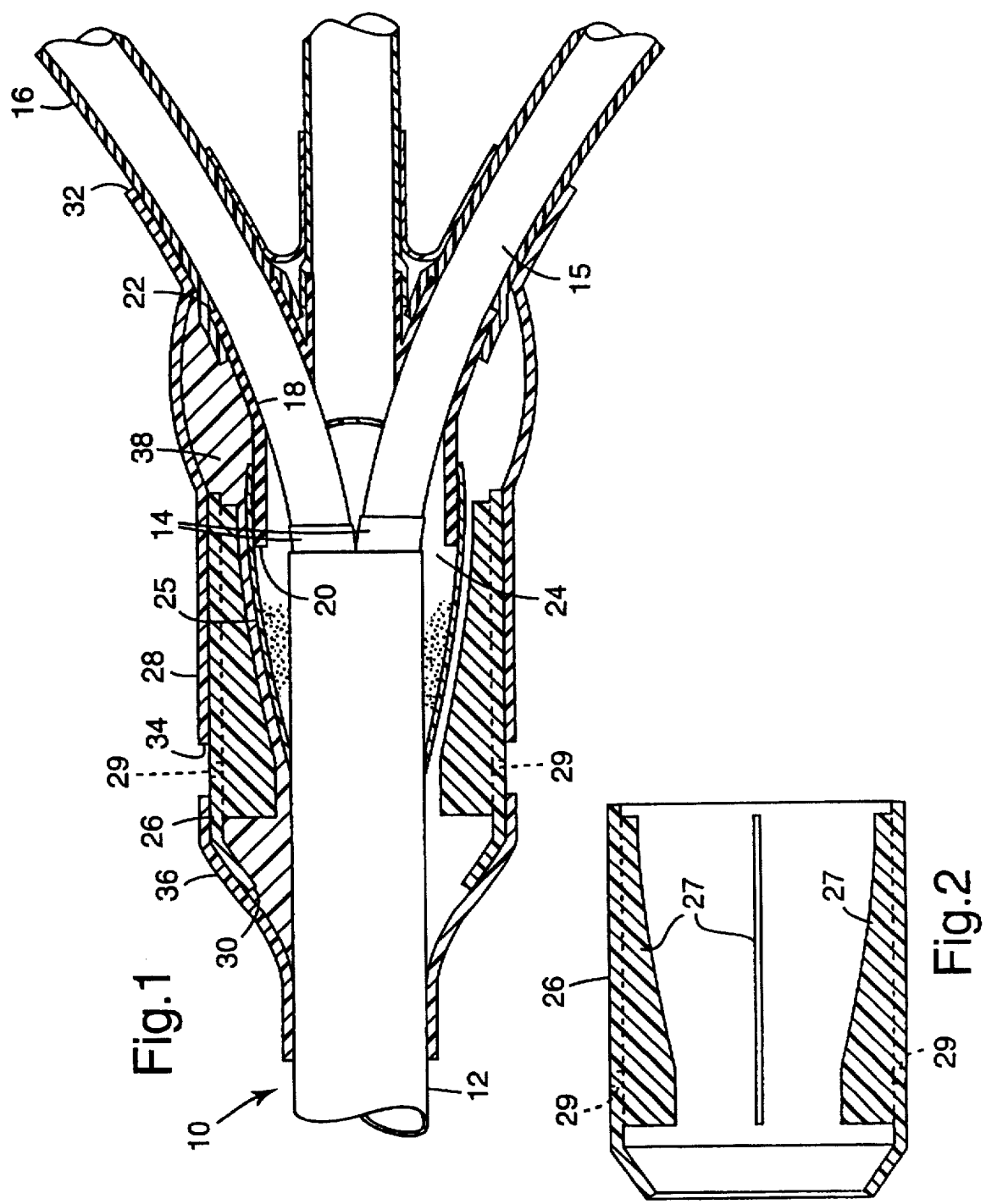

CABLE END SEAL FOR OIL-FILLED CABLES

FIELD OF THE INVENTION

The present invention generally relates to sealing the ends of multiple conductor electrical cables, and more particularly to a cable end seal for use when splicing or terminating a cable having an oil-impregnated layer as part of the dielectric system.

BACKGROUND OF THE INVENTION

Electrical cables, such as those used for telephone lines, high voltage lines, cable television, etc., can develop faults or breaks in the line due to manufacturing defects, misuse or environmental factors. Faults occur both in underground and aerial cables. Rather than replacing an entire section of such a cable, it is expedient to expose a portion of cable, repair the fault, and place an enclosure about the connection. Splicing of electrical power cables is similarly useful in the connection of successive cable sections, and in the termination of such cables.

One of the earliest constructions for these cables, particularly for underground power cables, consists of a lead jacket surrounding one or more conductors, with a layer of insulative, oil-impregnated paper placed between the lead jacket and the conductors. Although most modern underground cables now have extruded dielectric (plastic) coverings, with no fluid inside, there are still substantial amounts of the paper-insulated lead covered cables ("PILC") in use. A problem thus arises when a PILC cable needs to be repaired or terminated, due to the deleterious effects caused by the egress of the oil or other dielectric fluid.

U.S. Pat. No. 5,374,784, assigned to the assignee of the present invention and incorporated herein by reference, offers an approach to accomplishing a cable end seal by providing an elastomeric, pre-stretched tube adapted to be placed around the exposed end of the PILC cable, directly in contact with the oil-impregnated paper, and a heat recoverable tubular sleeve which is adapted to completely surround and confine the elastomeric tube. The heat recoverable sleeve mechanically restricts the elastomeric tube, preventing the elastomeric tube from swelling which, in turn, precludes absorption of the oil. A complete oil seal is thus achieved with only two layers in the joint, and without the need for oil-resistant mastics, sealing resins, or metal clamps. In another approach disclosed in U.S. Pat. No. 5,408,047, which is also owned by the assignee of the present invention and incorporated herein by reference, the heat-recoverable sleeve is replaced by epoxy-impregnated restricting tape which accomplishes the purpose of preventing the elastomeric tube from swelling.

The above-described patent is directed specifically to single-conductor cables. It is desirable to extend and adapt the oil-stop concept to cables having multiple conductors.

SUMMARY OF THE INVENTION

In accordance with the invention, there is provided a cable end seal at an end of a cable having a number of conductors and oil-impregnated, electrically insulative layers surrounding each conductor, the cable end seal comprising an oil stop overlying the insulative layer of each cable conductor, the oil stop including an elastomeric layer adjacent to the insulative layer and means for restricting the elastomeric layer overlying the elastomeric layer, an elastomeric inner boot having a glove-like shape including a generally cylindrical body, a single opening at one end of the body and multiple openings corresponding in number to the number of cable conductors at the other end of the body, the inner boot being applied to the cable such that the cable conductors exit one through each of the multiple openings and the multiple openings engage the oil stop of each conductor, and the single opening is directed toward the intact cable, preferably an oil restraining material disposed within the inner boot for at least temporarily preventing egress of oil from the cable, preferably a mold surrounding and radially spaced from the cable, an elastomeric outer boot having a glove-like shape including a generally cylindrical body, a single opening at one end of the body and multiple openings corresponding in number to the number of cable conductors at the other end of the body, the outer boot being applied to the cable such that the cable conductors exit one through each of the multiple openings and the multiple openings engage the oil stop of each conductor, and the single opening is directed toward the intact cable, the outer boot overlying a portion of the mold and sealing to the mold, and a hardenable material filling the mold and the outer boot and providing permanent containment of the oil when hardened.

This construction offers greater simplicity in design and application as compared to prior methods of providing a cable end seal, affording both cost and time savings. The novel cable end seal assembly adapts the end of the PILC cable and makes it suitable for connection to plastic (extruded dielectric) cable or fitted with a termination or other electrical accessory. Thus pre-molded or extruded cable accessories, which are designed for use with extruded dielectric cables and normally not usable with PILC cables, may be used to effect these connections.

BRIEF DESCRIPTION OF THE DRAWINGS

The present invention will be described with respect to the accompanying drawing wherein FIG. 1 is a cross-sectional view of a three-conductor PILC cable having a cable end seal applied according to the present invention.

FIG. 2 is a cross-sectional view of a hard mold with projections

DESCRIPTION OF THE PREFERRED EMBODIMENT

FIG. 1 illustrates an exemplary multi-conductor cable 10 which contains a dielectric fluid therein. Such a cable 10 is typically constructed of an outer lead jacket 12, surrounding a group of conductors each covered by an insulative layer formed of oil-impregnated paper and a semiconducting layer 14 formed of carbon-loaded paper. The present invention is primarily designed for making a transition from such an oil-filled cable 10. It should also be understood, however, that the invention will work with cables having other fluids therein, including those filled with a dielectric jelly. Some PILC cables also have a plastic sheath which surrounds the lead jacket 12.

The PILC cable 10 is prepared for splicing by first cutting off a large section of the lead jacket 12, thereby exposing semiconducting layers 14. Sharp corners at the edge of the lead jacket 12 should be peened. A section of the semiconducting layers 14 are similarly removed, exposing insulative layers 15. Finally, a section of the insulative layers 15 are removed, exposing the central conductors (not shown). Details of this preparation have not been illustrated for the sake of clarity but are illustrated and described in detail in the above-mentioned U.S. Pat. No. 5,374,784.

According to that patent, each phase of the cable 10 is completed by applying an oil stop layer 16 which includes an elastomeric tube and a restricting layer overlying the elastomeric tube. The elastomeric tube is typically fabricated by extrusion and, in its relaxed state, is generally cylindrical. It may be formed of any oil-absorbing elastomeric material. The preferred material for the elastomeric tube is ethylene-propylene non-conjugated diene terpolymer (EPDM), which is electrically insulative.

The restricting layer may be a heat recoverable sleeve formed from a wide variety of materials, particularly polymeric resins such as polytetrafluoroethylene, polychloroprene, fluoroelastomers or cross-linked polyolefins. The preferred material is polyvinylidene fluoride, which meets the primary requisites of being heat recoverable and electrically insulative, and having a crystalline melting point higher than that generated in emergency overload conditions of the cable 10. Such material is sold by Minnesota Mining and Manufacturing under the brand name Kynar. Other heat recoverable materials may be used if their melting point is greater than 125° C., and preferably about 175° C. The term "heat recoverable" refers to any thermoelastic material, which, upon the application of heat, either returns to its original (smaller) shape, or shrinks without having been previously deformed. As an alternative to the heat recoverable sleeve a restricting tape may be applied in overlapping fashion to the outer surface of the elastomeric tube. A suitable tape is an epoxy impregnated tape sold by the Minnesota Mining & Manufacturing Company under the product designation White Restricting Tape.

To seal the area where the three conductors branch from the cable body, a two-step approach is utilized. Generally speaking, the area where the individual conductors separate from the cable body is sealed with a slow-reacting fluid material injected into a mold surrounding the area. The material may be anything which hardens, such as polymer concrete, urethane or gels, but preferably is epoxy resin. However, contact with oil will prevent resin from reacting, and oil will migrate through other materials until the material hardens. In order to allow the resin or other material to harden, an inner rubber seal is provided which is preferably filled with an oil-restraining mastic which at least temporarily prevents any oil or other liquid dielectric from contacting the resin or other sealing material and possibly seeping through before hardening of the material. Attempts in the past to simply encapsulate the area in resin have failed because oil from the main portion of the cable prevented the resin from curing. The oil seeped through the resin causing small tunnels which allowed continued leakage.

According to the preferred sealing method, an inner boot 18 of rubber is provided which is formed in the shape of a glove with a large opening 20 at one end facing the intact cable 10 and a number of smaller openings 22 at the other end allowing the individual conductors to separate and exit the inner boot 18. Of course, the number of small openings 22 corresponds to the number of conductors and the small openings 22 are sized in diameter to effectively seal to the outer surface of the conductors. In this configuration shown in FIG. 1, the inner boot 18 is installed before the oil stops 16 are applied to the semiconductive layer 14 of the conductors, so that the oil stops 16 will overlap the outer surface of the inner boot 18 for a short distance. As an alternative, the small openings 22 may be sized to overlap the outer surfaces of the oil stop 16 after the same have been applied to the conductors.

The large opening 20 of the inner boot 18 is larger in diameter than the diameter of the cable 10 to allow material 24 within the inner boot 18 to extend from the boot 18 and along the outer surface of the cable 10 for a short distance. The temporary oil restraint material 24 within the inner boot 18 may be any mastic which will at least temporarily resist and retain oil such as that sold by the Minnesota Mining & Manufacturing Company in tape form under the designation 2228 rubber mastic, or may be a rubber tape such as that sold by Minnesota Mining & Manufacturing Company under the designation 23. In either case, a portion of the inner boot 18, the oil restraint material 24 and a portion of the cable 10 are preferably wrapped in restricting tape 25 such as the epoxy-impregnated tape described above and sold by Minnesota Mining & Manufacturing Company under the designations White Restricting Tape or glass cloth tape also sold by Minnesota Mining & Manufacturing Company.

Once this preparation of the inner boot 18 is completed, the second and more permanent layer of protection is applied. A hard mold 26, preferably of plastic, in the shape of a cylinder is preferably installed over the area of the inner boot 18, and an outer boot 28 is applied to overlap the mold 26. The mold may be of any material which is compatible with the materials injected therein as described below. The mold 26 may include a taper 30 at its end angled toward the intact cable 10. The mold 26 may also include projections or longitudinal ribs 27 (shown in phantom lines) extending radially inward from the inner surface of the mold 26 to maintain the mold 26 concentric with respect to the cable 10. The outer boot 28 is similar in shape to the inner boot 18 although, of course, larger in diameter and length. The small, exiting openings 32 of the outer boot 28 are sized to seal to the outer surface of the oil stop 16 of each conductor and the large opening 34 of the outer boot 28 is sized to seal to the outer surface of the mold 26. The open, tapered end 30 of the mold 26 is overwrapped with sealing tape 36 or a cold-shrink tubing product, both available from the Minnesota Mining & Manufacturing Company. The sealing product used extends to the cable 10 surface.

The cavity within the outer boot 28 and the mold 26 is filled with a hardenable sealing material 38 through a hole or cut in the boot 28 or a fill hole in the mold 26. If the material 38 is injected this way the mold 26 or boot 28 can be provided with small holes 29 (shown in phantom lines) to allow trapped air to escape. If the mold happens to be oriented vertically with the outer boot downward, the assembly can be filled through the open tapered end 30 of the mold 26 and the sealing tape 36 or cold-shrink tubing applied afterward. Once the mold 26 and boot 28 assembly is filled with the hardenable material 38, attachment of cable accessories to the bared ends of the conductors may proceed.

In time the material 38 will harden and permanently restrict the inner boot 18 from expanding to maintain the oil within against pressure generated by elevated temperatures due to energizing the cable.

Thus there has been described a cable end seal which is easily and effectively applied to oil filled cable to allow the connection of such cables to other types of cables or cable accessories. The cable end seal operates in the manner of the oil stop described in U.S. Pat. No. 5,374,784 in that a rubber layer (inner boot 18) is provided to seal the cable and prevent oil from escaping and a second material (hardenable material 38) is provided to restrict the rubber layer and prevent the rubber layer from degrading due to the absorption of oil and consequential swelling.

Although the invention has been described with respect to a particular embodiment including preferred parts and materials, it will be apparent to those skilled in the art that many modifications may be made without departing from the spirit of the invention. For example, the mold and/or the boots need not be circular in cross-section, and the mold may or may not be provided with such features as stand-off projections or ribs, air escape holes or resin fill holes. In fact, the mold may be eliminated if the outer boot is extended to cover the lead coating of the cable and is sized to seal to the cable. Likewise, the inner boot may be extended to seal to the cable and the White Restricting Tape or glass cloth tape eliminated. In addition, the oil-restraint material 24 within the inner boot 18 could be eliminated if care is taken to adequately seal the inner boot to the conductors and the cable, as by the use of White Restricting Tape. The materials described for the mold, boots and oil restraint and containment substances may be changed so long as the described function is accomplished.

The invention claimed is:

1. A cable end seal at an end of an intact cable having a number of conductors extending therefrom, and an oil-impregnated, electrically insulative layer surrounding each conductor, the cable end seal comprising:

an oil stop overlying the insulative layer of each cable conductor;

an elastomeric inner boot having a glove-like shape including a generally cylindrical body, a single opening at one end of said body and multiple openings corresponding in number to the number of cable conductors at the other end of said body, said inner boot being applied to the cable such that the cable conductors exit one through each of said multiple openings and said multiple openings engage said oil stop of each conductor, and said single opening is directed toward the intact cable;

an elastomeric outer boot having a glove-like shape including a generally cylindrical body, a single opening at one end of said body and multiple openings corresponding in number to the number of cable conductors at the other end of said body, said outer boot being applied to the cable such that the cable conductors exit one through each of said multiple openings and said multiple openings engage said oil stops of each conductor, and said single opening is directed toward the intact cable;

a mold surrounding and radially spaced from the cable and disposed to seal to said outer boot; and a hardenable material filling said outer boot and providing permanent containment of said oil when hardened.

2. A cable end seal according to claim 1 wherein said oil stop overlaps said inner boot.

3. A cable end seal according to claim 1 wherein said inner boot overlaps said oil stop.

4. A cable end seal according to claim 1 wherein said mold includes a tapered end extending toward the intact cable.

5. A cable end seal according to claim 1 wherein said mold includes projections extending radially inwardly to position said mold with respect to the cable.

6. A cable end seal according to claim 1 wherein said mold includes longitudinal ribs extending radially inwardly to position said mold with respect to the cable.

7. A cable end seal according to claim 1 wherein said mold includes air escape holes.

8. A cable end seal according to claim 1 further including overlapping tape extending from said mold to the cable to retain said hardenable material within said mold and said outer boot.

9. A cable end seal according to claim 1 wherein said hardenable material is epoxy sealing resin.

10. A cable end seal according to claim 1 further including an oil restraint material disposed within said inner boot for at least temporarily preventing egress of oil from the cable.

11. A cable end seal according to claim 10 wherein said oil restraint material is a rubber mastic.

12. A cable end seal according to claim 10 further including overlapped layers of tape extending from said inner boot single opening to the intact cable to contain said oil restraint material and seal said inner boot to the cable.

* * * * *